United States Patent [19]

Spencer

[11] Patent Number: 5,700,311
[45] Date of Patent: Dec. 23, 1997

[54] METHODS OF SELECTIVELY SEPARATING $CO_2$ FROM A MULTICOMPONENT GASEOUS STREAM

[76] Inventor: Dwain F. Spencer, 24 Fairway Pl., Half Moon Bay, Calif. 94019

[21] Appl. No.: 643,151

[22] Filed: Apr. 30, 1996

[51] Int. Cl.⁶ .................................................. B01D 53/78
[52] U.S. Cl. ........................ 95/236; 48/198.3; 423/220; 423/437 R; 585/15
[58] Field of Search ..................... 95/236, 149, 153; 55/222; 62/53.1; 48/127.3, 127.5, 198.3, 197 R, 197 FM, 198.7, 190; 585/15; 423/220, 437 R

[56] References Cited

U.S. PATENT DOCUMENTS

| | | | |
|---|---|---|---|
| 3,150,942 | 9/1964 | Vasan | 95/115 |
| 3,359,744 | 12/1967 | Bolez et al. | 62/632 |
| 3,479,298 | 11/1969 | Sze et al. | 48/198.7 |
| 3,838,553 | 10/1974 | Doherty | 95/98 |
| 4,235,607 | 11/1980 | Kinder et al. | 95/236 X |
| 4,861,351 | 8/1989 | Nicholas et al. | 95/93 |
| 5,397,553 | 3/1995 | Spencer | 48/190 X |
| 5,434,330 | 7/1995 | Hnatow et al. | 95/149 X |
| 5,562,891 | 10/1996 | Spencer et al. | 62/53.1 X |
| 5,600,044 | 2/1997 | Colle et al. | 95/153 X |

FOREIGN PATENT DOCUMENTS 3-164419  7/1991  Japan .

OTHER PUBLICATIONS

"A Preliminary Assessment of Carbon Dioxide Mitigation Options":; D.F. Spencer; Annu. Rev. Energy Environ,; 1991; 16:pp. 259–273.

"Fixation of Carbon Dioxide by Clathrate-Hydrate"; A. Saji et al.; Energy Convers. Mgmt.; 1992; vol. 33, No. 5–8; pp. 643–649.

"$CO_2$ Clathrate Formation and its Properties in the Simulated Deep Ocean"; N. Nishikawa et al.; Energy Convers. Mgmt.; 1992; vol. 33, No. 5–8, pp. 651–657.

"Deposition of $CO_2$ On the Seabed in the Form of Hydrates"; T. Austvik et al.; Energy Convers. Mgmt.; 1992; vol. 33, No. 5–8; pp. 659–666.

"The Fate of $CO_2$ Sequestered in the Deep Ocean"; D.S. Golomb et al.; Energy Convers. Mgmt.; 1992; vol. 33, No. 5–8; pp. 675–683.

Primary Examiner—Richard L. Chiesa
Attorney, Agent, or Firm—Bret Field, Esq.; Bozicveic & Reed LLP

[57] ABSTRACT

Methods are provided for the selective removal of $CO_2$ from a multicomponent gaseous stream to provide a $CO_2$ depleted gaseous stream having at least a reduction in the concentration of $CO_2$ relative to the untreated multicomponent gaseous stream. In the subject methods, the multicomponent gaseous stream is contacted with $CO_2$ nucleated water under conditions of selective $CO_2$ clathrate formation, where the $CO_2$ nucleated water serves as liquid solvent. The subject methods find use in a variety of applications where it is desired to selectively remove $CO_2$ from a multicomponent gaseous stream, including chemical feedstock processing applications and air emissions control applications.

10 Claims, 2 Drawing Sheets

METHODS OF SELECTIVELY SEPARATING $CO_2$ FROM A MULTICOMPONENT GASEOUS STREAM

FIELD OF THE INVENTION

The field of this invention is selective absorption of $CO_2$ gas.

INTRODUCTION

In many applications where mixtures of two or more gaseous components are present it is often desirable to selectively remove one or more of the component gases from the gaseous stream. Of increasing interest in a variety of industrial applications, including power generation and chemical synthesis, is the selective removal of $CO_2$ from multicomponent gaseous streams.

An example of where selective $CO_2$ removal from a multicomponent gaseous stream is desirable is the processing of synthesis gas or syngas. Syngas is a mixture of hydrogen, carbon monoxide and $CO_2$ that is readily produced from fossil fuels and finds use both as a fuel and as a chemical feedstock. In many applications involving syngas, the carbon monoxide is converted to hydrogen and additional $CO_2$ via the water-gas shift process. It is then often desirable to separate the $CO_2$ from the hydrogen to obtain a pure $H_2$ stream for subsequent use, e.g. as a fuel or feedstock.

As man made $CO_2$ is increasingly viewed as a pollutant, another area in which it is desirable to separate $CO_2$ from a multicomponent gaseous stream is in the area of pollution control. Emissions from industrial facilities, such as manufacturing and power generation facilities, often comprise $CO_2$. In such instances, it is often desirable to at least reduce the $CO_2$ concentration of the emissions. The $CO_2$ may be removed prior to combustion in some case and post combustion in others.

A variety of processes have been developed for removing or isolating a particular gaseous component from a multi-component gaseous stream. These processes include cryogenic fractionation, selective adsorption by solid adsorbents, gas absorption, and the like. In gas absorption processes, solute gases are separated from gaseous mixtures by transport into a liquid solvent. In such processes, the liquid solvent ideally offers specific or selective solubility for the solute gas or gases to be separated.

Gas absorption finds widespread use in the separation of $CO_2$ from multicomponent gaseous streams. In $CO_2$ gas absorption processes that currently find use, the follow steps are employed: (1) absorption of $CO_2$ from the gaseous stream by a host solvent, e.g. monoethanolamine; (2) removal of $CO_2$ from the host solvent, e.g. by steam stripping; and (3) compression of the stripped $CO_2$ for disposal, e.g. by sequestration through deposition in the deep ocean.

Although these processes have proved successful for the selective removal of $CO_2$ from a multicomponent gaseous stream, they are energy intensive. For example, using the above processes employing monoethanolamine as the selective absorbent solvent to remove $CO_2$ from effluent flue gas generated by a power plant often requires 25 to 30% of the available energy generated by the plant. In many situations, this energy requirement is prohibitive.

Accordingly, there is continued interest in the development of less energy intensive processes for the selective removal of $CO_2$ from multicomponent gaseous streams. Ideally, alternative $CO_2$ removal processes should be simple, require inexpensive materials and low energy inputs. For applications in which it is desired to effectively sequester the separated $CO_2$, of particular interest would be the development of alternative $CO_2$ absorbent solvents from which the absorbed $CO_2$ would not have to be subsequently stripped prior to sequestration.

RELEVANT LITERATURE

Patents disclosing methods of selectively removing one or more components from a multicomponent gaseous stream include: U.S. Pat. Nos. 3,150,942; 3,838,553; 3,359,744; 3,479,298 and 4,861,351.

Reports summing currently available processes for reducing the $CO_2$ content of multi-component gaseous streams, such as coal fired power plant emissions, include: Smelsen, S. C. et al., "Engineering and Economic Evaluation of $CO_2$ Removal From Fossil-Fuel-Fired Powerplants, Vol. 1: Pulverized-Coal-Fired Powerplants," EPRI IE-7365 Vol. 1 and Vol. 2; Coal Gasification-Combined Cycle Power Plants, EPRI IE-7365, Vol. 2.

Patents and references discussing $CO_2$ clathrate formation include Japanese unexamined patent application 3-164419, Nishikawa et al., "$CO_2$ Clathrate Formation and its Properties in the Simulated Deep Ocean," Energy Convers. Mgmt. (1992) 33:651–657; Saji et al., "Fixation of Carbon Dioxide by Clathrate-Hyrdrate," Energy Convers. Mgmt. (1992) 33: 643–649; Austvik & Løken, "Deposition of $CO_2$ on the Seabed in the Form of Clathrates, " Energy Convers. Mgmt. (1992) 33: 659–666; Golumb et al., "The Fate of $CO_2$ Sequestered in the Deep Ocean," Energy Convers. Mgmt. (1992) 33: 675–683; Spencer, "A Preliminary Assessment of Carbon Dioxide Mitigation Options," Annu. Rev. Energy Environ. (1991) 16: 259–273.

SUMMARY OF THE INVENTION

Methods are provided for the selective removal of $CO_2$ from a multicomponent gaseous stream. In the subject methods, a multicomponent gaseous stream comprising $CO_2$ is contacted with $CO_2$ nucleated water under conditions of selective $CO_2$ clathrate formation, conveniently in a reactor. The $CO_2$ nucleated water may either be formed in situ in the reactor or in a separate reactor, where the water may be fresh or salt water. Once the $CO_2$ nucleated water is formed, it serves as a selective $CO_2$ liquid solvent. Upon contact of the gaseous stream with the $CO_2$ nucleated water, $CO_2$ is selectively absorbed from the gaseous stream by the $CO_2$ nucleated water and concomitantly fixed as $CO_2$ clathrates to produce a $CO_2$ depleted multicomponent gaseous stream and a slurry of $CO_2$ clathrates. The resultant $CO_2$ depleted multicomponent gaseous stream is then separated from the $CO_2$ clathrate slurry, either in the reactor itself or in a downstream separator.

DETAILED DESCRIPTION OF THE INVENTION

Figure 1:
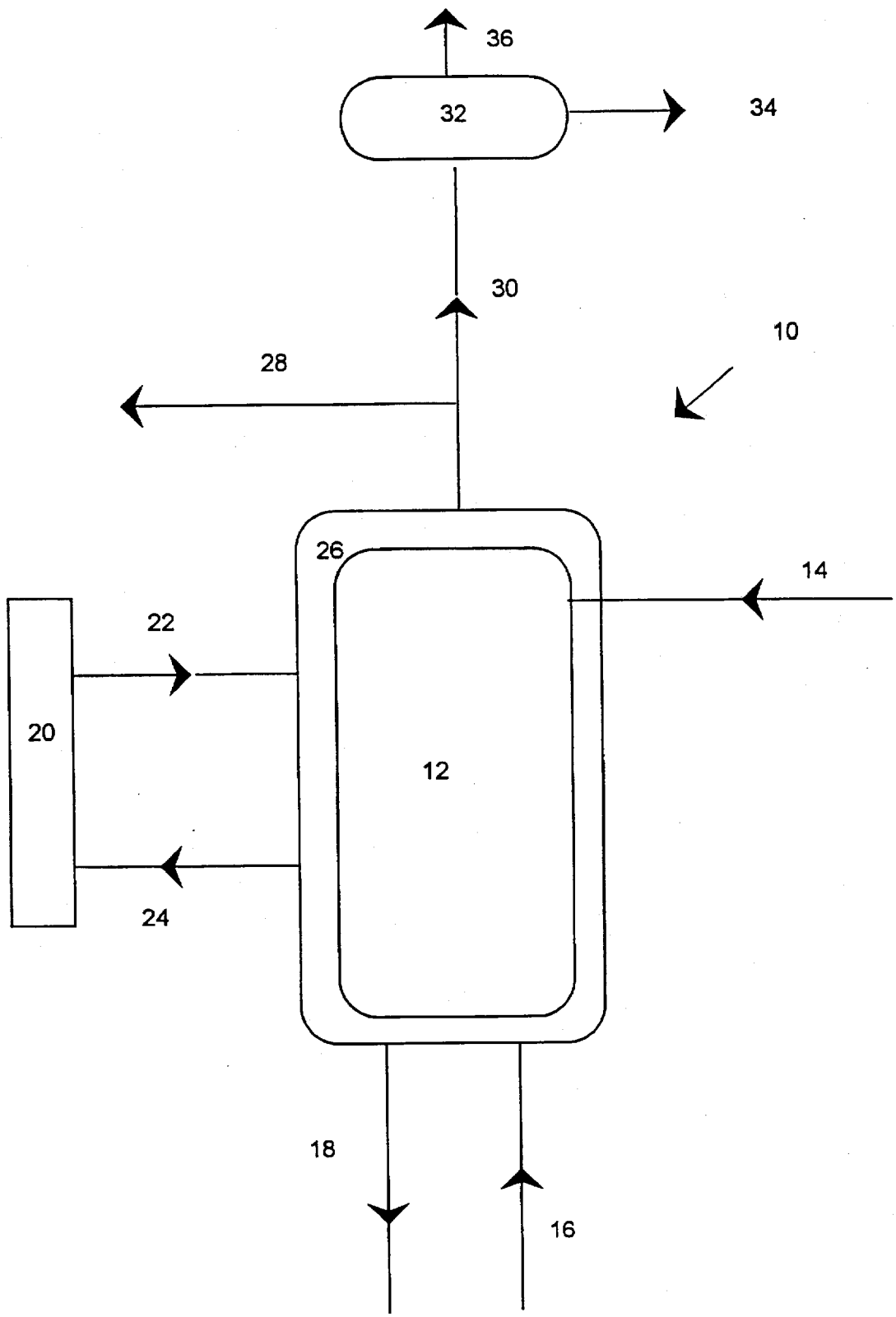
FIG. 1 provides a schematic representation of an embodiment of a countercurrent reactor for practicing the subject invention.

Methods for selectively removing $CO_2$ from a multicomponent gaseous stream are provided. In the subject methods, a multicomponent gaseous stream is contacted with $CO_2$ nucleated water under conditions of selective $CO_2$ clathrate formation, conveniently in a reactor. The $CO_2$ nucleated water may be prepared in situ in the reactor, or in a separate reactor, where the water may be either fresh or salt water. Upon contact of the gaseous stream with the $CO_2$ nucleated water, $CO_2$ is selectively absorbed from the gaseous stream by the $CO_2$ nucleated water and concomitantly fixed in the form of the $CO_2$ clathrates. Contact results in the production of a $CO_2$ depleted gaseous stream and a slurry of $CO_2$ clathrates, which are then separated. The subject invention finds use in a variety of applications, including the treatment of power plant emissions, methane-$CO_2$ gaseous streams, chemical feedstocks, in hydrogen purification and the like.

Critical to the subject invention is the use of $CO_2$ nucleated water as a liquid solvent to selectively absorb the gaseous $CO_2$ from the multicomponent gas phase stream. The $CO_2$ nucleated water employed in the subject invention comprises dissolved $CO_2$ in the form of $CO_2$ hydrate or clathrate precursors, where the precursors are in metastable form. The mole fraction of $CO_2$ in the $CO_2$ nucleated water ranges from about 0.01 to 0.04, usually from about 0.02 to 0.04, more usually from about 0.03 to 0.04 The temperature of the $CO_2$ nucleated water will typically range from about $-1.5°$ to $10°$ C., preferably from about $-1.5°$ to $5°$ C., and more preferably from about $-1.5°$ to $0°$ C.

$CO_2$ nucleated water employed in the subject methods as the selective liquid solvent may be prepared using any convenient means. One convenient means of obtaining $CO_2$ nucleated water is described in U.S. application Ser. No. 08/291,593, filed Aug. 16, 1994, now U.S. Pat. No. 5,562,891, the disclosure of which is herein incorporated by reference. In this method $CO_2$ is first dissolved in water using any convenient means, e.g. bubbling a stream of $CO_2$ gas through the water, injection of $CO_2$ into the water under conditions of sufficient mixing or agitation to provide for homogeneous dispersion of the $CO_2$ throughout the water, and the like, where the $CO_2$ source that is combined with the water in this first stage may be either in liquid or gaseous phase. Where gaseous $CO_2$ is combined with water to make the $CO_2$ nucleated water, the gaseous $CO_2$ will typically be pressurized, usually to pressures ranging between 6 to 100 atm, more usually between about 10 to 20 atm. The water in which the $CO_2$ is dissolved may be fresh water or salt water, e.g. sea water. The temperature of the water will generally range from about $-1.5°$ to $10°$ C., usually from about $-1.5°$ to $5°$ C., more usually from about $0°$ to $1°$ C. The water may be obtained from any convenient source, where convenient sources include the deep ocean, deep fresh water aquifers, powerplant cooling ponds, and the like, and cooled to the required reactor conditions.

The amount of $CO_2$ which is dissolved in the water will be determined in view of the desired $CO_2$ mole fraction of the $CO_2$ nucleated water to be contacted with the gaseous stream. One means of obtaining $CO_2$ nucleated water having relatively high mole fractions of $CO_2$ is to produce a slurry of $CO_2$ clathrates and then decompose the clathrates by lowering the pressure and/or raising the temperature of the water component of the slurry.

The first step of the subject method is to contact the multicomponent gaseous stream with $CO_2$ nucleated water under conditions of $CO_2$ clathrate formation, preferably under conditions of selective $CO_2$ clathrate formation. The $CO_2$ nucleated water may be contacted with the gaseous stream using any convenient means. Preferred means of contacting the $CO_2$ nucleated water with the gaseous stream are those means that provide for efficient absorption of the $CO_2$ from the gas through solvation of the gaseous $CO_2$ in the liquid phase $CO_2$ nucleated water. Means that may be employed include concurrent contacting means, i.e. contact between unidirectionally flowing gaseous and liquid phase streams, countercurrent means, i.e. contact between oppositely flowing gaseous and liquid phase streams, and the like. Thus, contact may be accomplished through use of spray, tray, or packed column reactors, and the like, as may be convenient.

The clathrate formation conditions under which the gaseous and liquid phase streams are contacted, particularly the temperature and pressure, may vary but will preferably be selected so as to provide for the selective formation of $CO_2$ clathrates, to the exclusion of clathrate formation of other components of the multi-component gaseous stream. Generally, the temperature at which the gaseous and liquid phases are contacted will range from about $-1.5°$ to $10°$ C., usually from about $-1.5°$ to $5°$ C., more usually from about $0°$ to $1°$ C., while the pressure will generally be at least about 6 atm, usually at least about 8 atm, and more usually at least about 10 atm, but will generally not exceed 100 atm, and more usually will not exceed 20 atm, where higher pressures are required when higher temperatures are employed, and vice versa.

Upon contact of the gaseous stream with the $CO_2$ nucleated water, $CO_2$ is selectively absorbed from the gaseous stream into the $CO_2$ nucleated water liquid phase. The absorbed $CO_2$ is concomitantly fixed as solid $CO_2$ clathrates in the liquid phase. Contact between the gaseous and liquid phases results in the production of a $CO_2$ depleted multicomponent gaseous stream and a slurry of $CO_2$ clathrates. In the $CO_2$ depleted multicomponent gaseous stream, the $CO_2$ concentration is reduced by at least about 50%, usually by at least about 70%, and more usually by at least about 90%, as compared to the untreated multicomponent gaseous stream. In other words, contact of the multicomponent gaseous stream with the $CO_2$ nucleated water results in at least a decrease in the concentration of the $CO_2$ of the gaseous phase, where the decrease will be at least about 50%, usually at least about 70%, more usually at least about 90%. In some instances the concentration of $CO_2$ in the gaseous phase may be reduced to the level where it does not exceed 1% (v/v), such that the treated gaseous stream is effectively free of $CO_2$ solute gas.

As discussed above, the $CO_2$ absorbed by the $CO_2$ nucleated water is concomitantly fixed in the form of stable $CO_2$ clathrates. Fixation of the $CO_2$ in the form of stable $CO_2$ clathrates results in the conversion of the $CO_2$ nucleated water to a slurry of $CO_2$ clathrates. The slurry of $CO_2$ clathrates produced upon contact of the gaseous stream with the $CO_2$ nucleated water comprises $CO_2$ stably fixed in the form of $CO_2$ clathrates and water. Typical mole fractions of $CO_2$ in stable clathrates are 0.12 to 0.15, as compared to 0.02 to 0.04 in the $CO_2$ nucleated water.

As described above, the $CO_2$ nucleated water that serves as the selective liquid solvent for the $CO_2$ solute gas of the multicomponent gaseous stream is produced by dissolving $CO_2$ in water. As such, in some embodiments of the subject invention, $CO_2$ free water may be contacted with the multicomponent gaseous stream under appropriate conditions to first produce the $CO_2$ nucleated water, where contact will be subsequently maintained to produce the $CO_2$ clathrate slurry. In other words, the separate steps of $CO_2$ nucleated water production and the contact between the gaseous stream and the $CO_2$ nucleated water are combined into one continuous process.

The second step of the subject method is the separation of the treated gaseous phase from the $CO_2$ clathrate slurry. As convenient, the gaseous phase may be separated from the slurry in the reactor or in a downstream gas-liquid separator. Any convenient gas-liquid phase separation means may be employed, where a number of such means are known in the art.

Where it is desired to sequester the $CO_2$ clathrates produced by the subject method, the resultant $CO_2$ clathrate slurry may be disposed of directly as is known in the art, e.g. through placement in gas wells, the deep ocean or freshwater aquifers, and the like, or subsequently processed to separate the clathrates from the remaining nucleated water, where the isolated clathrates may then be disposed of according to methods known in the art and the remaining nucleated water recycled for further use as a selective $CO_2$ absorbent in the subject methods, and the like. Where desired, $CO_2$ can easily be regenerated from the clathrates, e.g. where $CO_2$ is to be a product, using known methods.

A variety of multicomponent gaseous streams are amenable to treatment according to the subject methods. Multicomponent gaseous streams that may be treated according to the subject invention will comprise at least two different gaseous components and may comprise five or more different gaseous components, where at least one of the gaseous components will be $CO_2$, where the other component or components may be one or more of $N_2$, $O_2$, $H_2O$, $CH_4$, $H_2$, CO and the like, as well as one or more trace gases. The mole fraction of $CO_2$ in the multicomponent gaseous streams amenable to treatment according to the subject invention will typically range from about 0.05 to 0.65, usually from about 0.10 to 0.60, more usually from about 0.10 to 0.50. As mentioned above, by controlling the clathrate formation conditions of contact appropriately, contact between the $CO_2$ nucleated water and the gas can be controlled to provide for the selective formation of $CO_2$ clathrates. The particular conditions which provide for the best selectivity with a particular gas can readily be determined empirically by those of skill in the art. Particular multicomponent gaseous streams of interest that may be treated according to the subject invention include power plant flue gas, turbo charged boiler product gas, coal gasification product gas, shifted coal gasification product gas, anaerobic digester product gas, and the like.

For the treatment of a shifted coal gasification product gas, the untreated gas will typically comprise $H_2$, $H_2O$, $CO_2$ and trace gases, where the mole fraction of $CO_2$ will range from about 0.30 to 0.45, and will be at a temperature ranging from about 20° to 30° C. and a pressure ranging from about 20 to 40 atm. The product gas will first be cooled to a temperature ranging from −30° to 0° C. and then contacted with $CO_2$ nucleated water, as described above, to produce $CO_2$ depleted shifted coal gasification product gas and a slurry of $CO_2$ clathrates. The resultant $CO_2$ depleted product gas and $CO_2$ clathrate slurry may then be separated and the product gas used as a fuel or for chemical synthesis.

The invention will now be described further in terms of the figures, which provide schematic representations of countercurrent and concurrent reactors for carrying out the subject invention. FIG. 1 provides a schematic representation of an embodiment of a counter current reactor which may be used for carrying out the subject process. Reactor 10 comprises counter current gaseous-liquid phase contact region 12 surrounded by refrigerant chamber 26, which serves to keep the temperature of region 12 suitable for selective $CO_2$ clathrate formation. Multicomponent gaseous stream 16 comprising $CO_2$ enters region 12 where it is contacted with $CO_2$ nucleated water, or non-nucleated water if the the $CO_2$ nucleated water is to be formed in situ, from feed stream 14. The region may have an open structure, i.e. where the nucleated water is sprayed in countercurrent to the gas, a trayed structure or a packed structure, as is known in the art. Fresh refrigerant liquid is introduced into refrigerant chamber 26 by feed stream 22 and spent refrigerant, represented by stream 24, is returned to refrigerant system 20, where it is refreshed and cycled back to chamber 26. Treated gas, represented by stream 30, leaves chamber 12 and may be recycled through line 28 or passed through a liquid, gas phase separator 32 to yield dry product gas, represented by stream 36, and water, represented by stream 34. The resultant slurry of $CO_2$ clathrates and nucleated water, represented by stream 18, may be sequestered using any convenient means, as described above.

Figure 2:
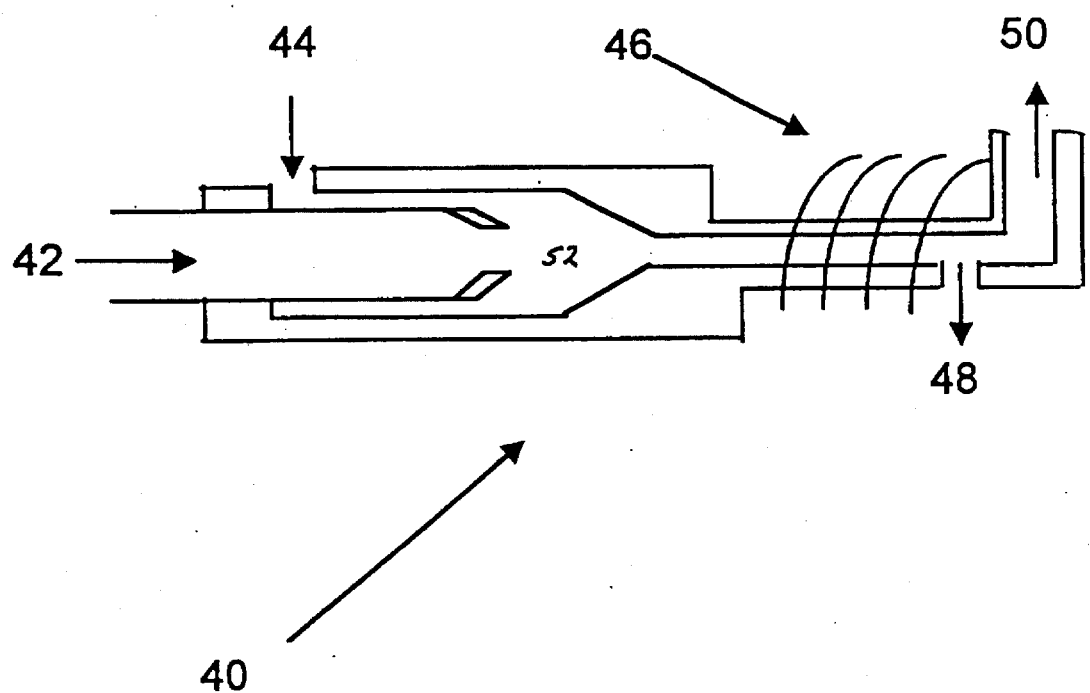
FIG. 2 provides a schematic representation of an enbodiment of a concurrent reactor for practicing the subject invention.

FIG. 2 provides a schematic representation of a concurrent reactor for carrying out the subject invention, in which the gaseous stream and liquid phase are contacted in unidirectional flow. With concurrent reactor 40, multicomponent gaseous stream 42 and liquid $CO_2$ nucleated water stream 44 are introduced separately into the reactor and flow to a combination region 52 where they then travel together to a region of selective $CO_2$ clathrate formation cooled by refrigerant coils 46. The resultant slurry of $CO_2$ clathrates, represented by stream 48, is separated from the $CO_2$ depleted gaseous stream 50. The $CO_2$ clathrate slurry 48 may then be sequestered as described above, while the $CO_2$ depleted gaseous stream 50 may be further processed in a liquid-gas phase separator, as described above.

The following examples are offered by way of illustration and not by way of limitation.

EXPERIMENTAL

The following experiments demonstrate the viability of reducing the $CO_2$ content of multicomponent gaseous streams by directly contacting the streams with $CO_2$ nucleated water under conditions of selective $CO_2$ clathrate formation. The following gaseous streams are representative of multicomponent gaseous suitable for treatment with the subject methods.

| Gas Stream | Initial Temp. (°C.) | Initial Pressure (ATM, gauge) | Components | Approximate $CO_2$ Mole Fraction |
|---|---|---|---|---|
| Power Plant Flue Gas | 80–150 | 0.1–0.2 | $N_2$, $O_2$, $H_2O$, $CO_2$, & Trace Gases | 0.10–0.15 |
| Turbo Charged Boiler | 80–150 | 10–20 | $N_2$, $O_2$, $H_2O$, $CO_2$, & Trace Gases | 0.10–0.15 |
| Coal Gasification Product Gas | 20–30 | 20–40 | $H_2$, CO, $H_2O$, $CO_2$, & Trace Gases | 0.02–.12 |
| Shifted Coal Gasification Product Gas | 20–30 | 20–40 | $H_2$, $H_2O$, $CO_2$, & Trace Gases | 0.30–0.45 |
| Anaerobic Digester Product Gas | 20–40 | 0–0.2 | $CH_4$, $CO_2$ | 0.40–0.50 |

I. Power Plant Flue Gas

Flue gas from a conventional coal fired boiler is processed to remove sulfur oxides, some of the nitrogen oxides and any particulate matter. The processed flue gas is then compressed to approximately 15 atm. The flue gas is then contacted with $CO_2$ in the counter current reactor shown in FIG. 1, where the temperature in the reactor is maintained at 0.5° C. and the pressure is maintained at approximately 15 atm.

The flue gas is scrubbed to form a slurry of $CO_2$ clathrates and $CO_2$ free gas. The $CO_2$ free gas, comprising $N_2$, $O_2$, $H_2O$ and trace gases is then separated from the $CO_2$ clathrate slurry, and reheated to the required stack gas exhaust temperature. The $CO_2$ clathrate slurry is sequestered through deposition in the deep ocean. Since modest pressure levels (10–20 atm) are maintained in the reactor, minimal amounts of nitrogen or oxygen clathrates form during the process.

II. Turbo Charged Boiler Emission Gas

Coal is combusted in a turbo charged boiler. The exhaust gas, containing nitrogen ($N_2$), oxygen ($O_2$), water vapor, carbon dioxide and trace gases is cooled to 0° C. The cooled exhaust gas is then contacted with $CO_2$ nucleated water in the reactor shown in FIG. 1. The pressure inside the reactor is approximately 15 atm while the temperature is maintained at 0° C. Contact in the reactor results in the production of $CO_2$ free gas and a slurry comprising $CO_2$ clathrates. The $CO_2$ free exhaust gas stream is then reheated using a recuperative heat exchanger and exhausted to the atmosphere. The $CO_2$ clathrate slurry is sequestered through deposition in the deep ocean.

Since the reactor conditions are controlled to 10 to 20 atm, very little nitrogen or oxygen clathrates are formed.

III. Coal Gasification Product Gas

Syngas is produced through gasification of coal with nearly pure oxygen. The resultant syngas comprises hydrogen, carbon monoxide, water vapor, carbon dioxide, and trace gases. Following removal of the trace gases, the syngas (which is at 20 to 40 atm) is cooled to 0° C. and contacted with $CO_2$ nucleated water in the countercurrent reactor shown in FIG. 1. Contact of the syngas with the $CO_2$ nucleated water results in the production of a slurry of $CO_2$ clathrates and a $CO_2$ free syngas, which are then separated. The resultant $CO_2$ free syngas may be utilized as a chemical feedstock or fuel.

IV. Steam Shifted Coal Gasification Product Gas

Prior to contact with $CO_2$ nucleated water, synthesis gas produced in accordance with Example III above is steam shifted to produce a gas consisting essentially of $CO_2$ and $H_2$. The shifted gas is then contacted with $CO_2$ nucleated water in the countercurrent reactor shown in FIG. 1, where the pressure is 20 to 40 atm and the temperature is 0° C. Contact between the shifted synthesis gas and the $CO_2$ nucleated water results in the fixation of essentially 100% of the $CO_2$ component of the shifted synthesis gas as $CO_2$ clathrates, since the hydrogen does not form stable clathrates. The resultant slurry comprising the $CO_2$ clathrates is then sequestered by deposition in the deep ocean. The treated syngas is an essentially pure hydrogen stream which is further used in power production, as refinery hydrogen or in chemical synthesis.

V. Anaerobic Digester Product Gas

Product gas comprising 50–60% $CH_4$ and 50–40% $CO_2$, as well as certain trace gases such as ammonia and hydrogen sulfide, is obtained from the anaerobic digestion of sewage sludge, wastes, mircoalgae or macroalgae. The product gas is at atmospheric pressure.

The product gas is compressed to approximately 15 atm and combined with $CO_2$ nucleated water in the countercurrent reactor shown in FIG. 1. The pressure in the reactor is approximately 15 atm and the temperature is 0° C. Contact between the product gas and the $CO_2$ nucleated water results in fixation of 100% of the $CO_2$ of the product gas as clathrates, leaving an essentially pure methane stream. The $CO_2$ clathrate comprising slurry is deposited in the ocean, as described above, while the pure methane stream is condensed to produce liquefied natural gas.

VI. Concurrent Reactor

Each of the above treatments in Examples I through V are carried out in a concurrent reactor as shown in FIG. 2.

It is evident from the above results that a simple and efficient method for the selective removal of $CO_2$ from a multicomponent gaseous stream is provided. By using $CO_2$ nucleated water as a selective $CO_2$ absorbent, great efficiencies are achieved through reductions in the overall energy input requirements and the number of steps necessary for complete $CO_2$ removal, fixation and disposal. In particular, by using $CO_2$ nucleated water as the absorbent solvent, $CO_2$ is readily removed from the gaseous stream and immediately fixed in a form suitable for disposal.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A method for removing $CO_2$ from the multicomponent gaseous stream to produce a $CO_2$ depleted gaseous stream, said method comprising:

contacting said multicomponent gaseous stream with $CO_2$ nucleated water under conditions of $CO_2$ clathrate formation wherein the temperature ranging from −1.5° to 10° C. and the pressure ranges from at least about 6 atm to 20 atm, whereby $CO_2$ is absorbed from said gaseous stream by said $CO_2$ nucleated water and concomitantly fixed as $CO_2$ clathrates upon said contacting, whereby a $CO_2$ depleted gaseous stream and a $CO_2$ clathrate slurry are produced; and separating said $CO_2$ depleted gaseous stream from said $CO_2$ clathrate slurry.

2. The method according to claim 1, wherein the temperature of said conditions of $CO_2$ clathrate formation ranges from −1.5° to 10° C.

3. The method according to claim 1, wherein the pressure of said conditions of $CO_2$ clathrate formation is at least about 10 atm.

4. The method according to claim 1, wherein said $CO_2$ nucleated water has a $CO_2$ mole fraction of between about 0.01 to 0.04.

5. A method for selectively removing $CO_2$ from a multicomponent gaseous stream to produce a $CO_2$ depleted gaseous stream, said method comprising:

contacting said multicomponent gaseous stream with $CO_2$ nucleated water under conditions of selective $CO_2$ clathrate formation wherein the temperature ranges from about −1.5° to 10° C. and the pressure ranges from about 10 to 20 atm, whereby $CO_2$ is absorbed from said gaseous stream by said $CO_2$ nucleated water and concomitantly fixed as $CO_2$ clathrates upon said contacting, whereby a $CO_2$ depleted gaseous stream and a $CO_2$ clathrate slurry are produced;

and separating said $CO_2$ depleted gaseous stream from said $CO_2$ clathrate slurry.

6. The method according to claim 5, wherein said contacting of said multicomponent gaseous stream and $CO_2$ nucleated water reduces the concentration of said $CO_2$ in said multicomponent gaseous stream by at least about 50%.

7. The method according to claim 5, wherein said method further comprises sequestering said $CO_2$ clathrate slurry.

8. The method according to claim 5, wherein said multicomponent gaseous stream is selected from the group of multicomponent gaseous streams consisting of power plant flue gas, turbo charged boiler emission gas, coal gasification product gas, shifted coal gasification product gas, and anaerobic digester product gas.

9. A method for selectively removing $CO_2$ from shifted coal gasification product gas to produce $CO_2$ depleted shifted coal gasification product gas, said method comprising:

reducing the temperature of said coal gasification product gas to a range of from about $-1.5°$ to $10°$ C.;

contacting said reduced temperature coal gasification product gas with $CO_2$ nucleated water under conditions of selective $CO_2$ clathrate formation wherein the temperature ranges from about $-1.5°$ to $10°$ C. and the pressure ranges from about 10 to 20 atm, whereby $CO_2$ is absorbed from said gaseous stream by said $CO_2$ nucleated water and concomitantly fixed as $CO_2$ clathrates upon said contacting, whereby a $CO_2$ depleted shifted coal gasification product gas and a $CO_2$ clathrate slurry are produced;

and separating said $CO_2$ depleted shifted coal gasification product gas from said $CO_2$ clathrate slurry.

10. The method according to claim 9, wherein said method further comprises sequestering said $CO_2$ clathrate slurry.

* * * * *